Nov. 17, 1953    A. E. ARMSTRONG    2,659,536
HEATING SYSTEM AND CONTROL THEREFOR
Filed Oct. 1, 1951    2 Sheets-Sheet 2

INVENTOR.
Adam E. Armstrong
BY
Attorney

Patented Nov. 17, 1953

2,659,536

UNITED STATES PATENT OFFICE 2,659,536

HEATING SYSTEM AND CONTROL THEREFOR

Adam E. Armstrong, Three Rivers, Mich., assignor to Armstrong Machine Works, Three Rivers, Mich.

Application October 1, 1951, Serial No. 249,104

10 Claims. (Cl. 237—8)

This invention relates to improvements in heating systems and controls therefor.

The main objects of this invention are:

First, to provide a heating system employing a forced circulation heating medium in which the temperature of the heated space is automatically and very accurately controlled.

Second, to provide a control mechanism for heating systems which can be readily installed in heating systems having a closed circuit circulating medium.

Third, to provide a heating system control having these advantages in which the temperature of the heated space may be thermostatically regulated.

Objects relating to details and economies of the invention will appear from the description to follow. The invention is defined and pointed out in the claims.

Figure 1:
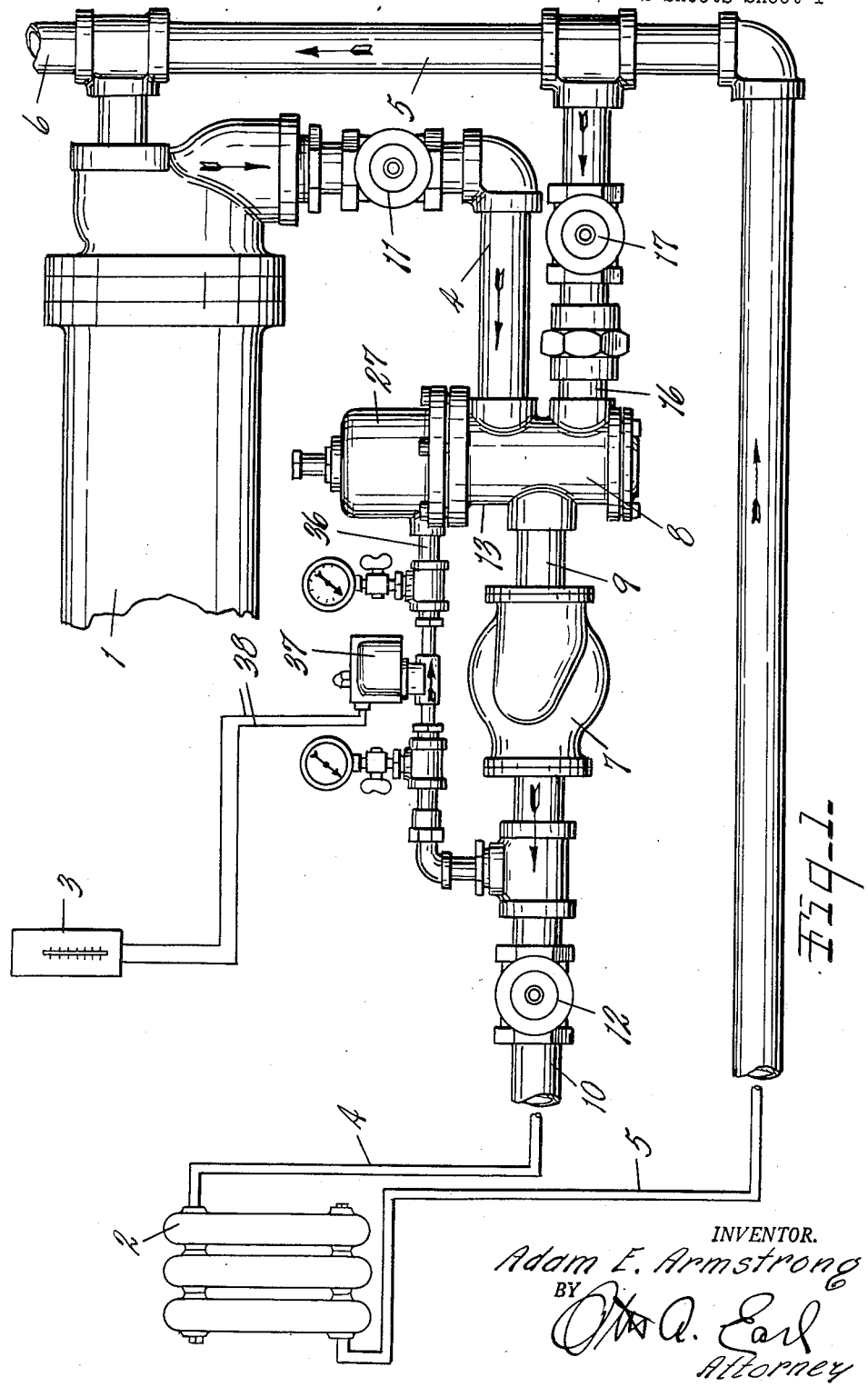
Fig. 1 is a view, largely diagrammatic insofar as the relation of the parts is concerned, of a heating system embodying my invention with several parts shown conventionally.

It should be understood that in the accompanying drawing no attempt has been made to illustrate the parts in relative dimensions or their location in the system insofar as space and dimension is concerned.

In the accompanying drawing 1 represents a hot water boiler, 2 a radiator or heat exchange unit and 3 a thermostat in the space to be heated. The boiler is connected to the radiator by the feed conduit 4 and the return conduit 5. 6 represents a connection to an expansion tank. The circulating pump shown conventionally at 7 is in the feed conduit line. These parts may be conventional but preferably employ a thermostat embodying the features of the Dehn and Armstrong Patent 2,418,762, issued April 8, 1947, with the exception only one contact point is utilized in this installation.

I control the temperature of the heating medium by controlling the circulation thereof through the boiler or heating unit. The circulation control valve designated generally by the numeral 8 is disposed in the feed conduit in advance of the circulating pump. The portion 9 of the feed conduit between the valve 8 and pump 7 constitutes the inlet of the pump. The portion 10 of the conduit constitutes the discharge of the pump. There is substantial variation in the pressure between the inlet and the discharge of the pump. The feed conduit is provided with a manually adjustable flow regulating valve 11 in advance of the control valve 8 and a manually adjustable valve 12 at the discharge side of the pump.

The valve 8 comprises a casing 13 having a feed chamber 14 to which the feed conduit 4 is connected and a by-pass circulation chamber 15 to which the by-pass conduit 16 is connected. The by-pass conduit 16 connects the return conduit to the by-pass chamber 15. This by-pass conduit 16 is preferably provided with a manually adjustable valve 17. The pump intake portion 9 of the feed conduit opens to the delivery chamber 18 of the valve casing. The valve casing is provided with a feed port 19 and a circulation port 20 disposed in aligned spaced relation and both opening to the delivery chamber 18.

In the embodiment illustrated the ports are formed by tubular members 21 and 22, the adjacent ends of which constitute valve seats 23. The double valve member 24 is adapted to alternately close either of these ports, that is, it is common to both ports. The stem 25 projects into the pressure chamber 26 which in effect constitutes a part of the valve casing.

Figure 2:
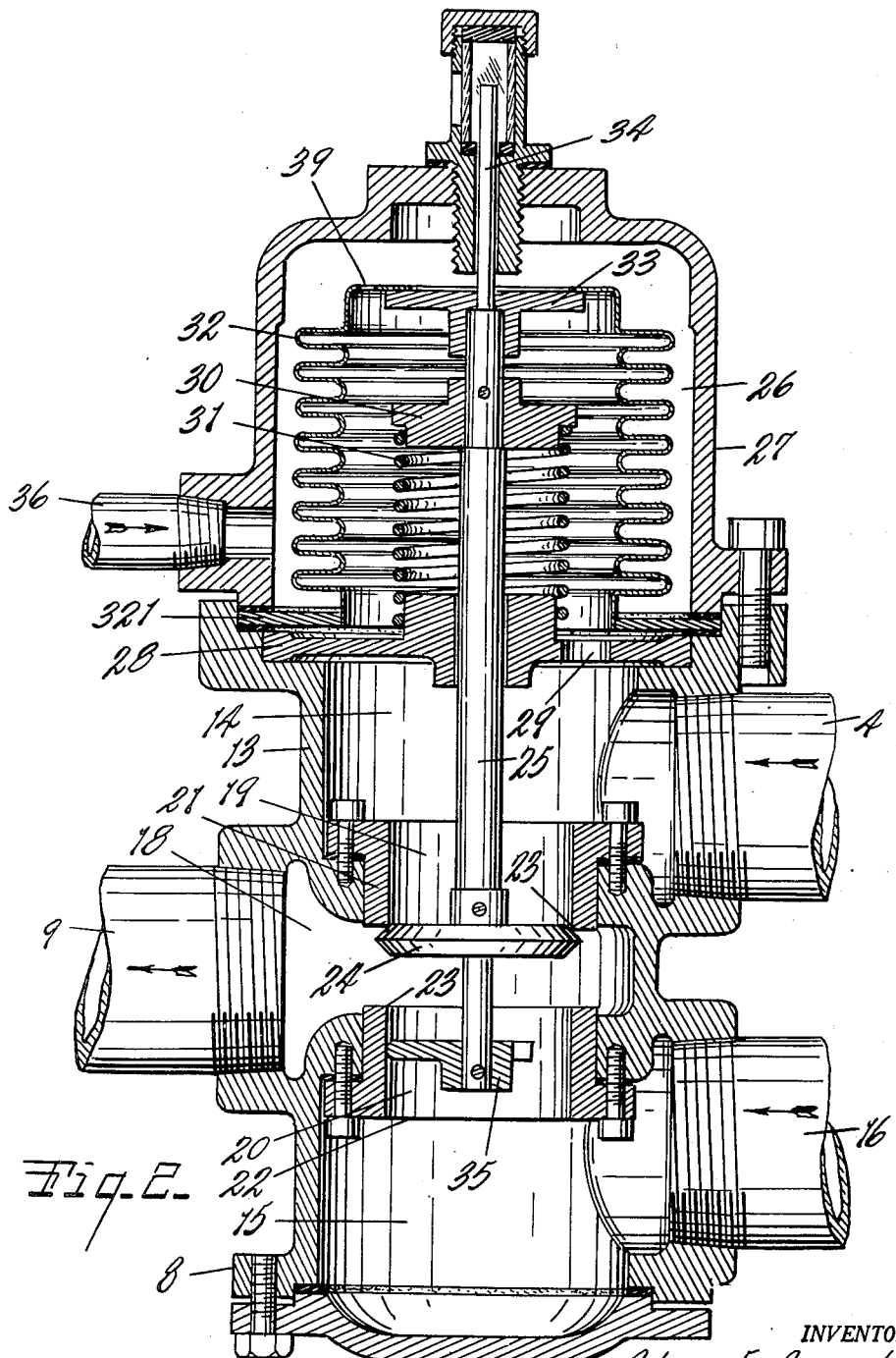
Fig. 2 is an enlarged vertical section of the circulation valve of my invention.

In the embodiment illustrated the pressure chamber is formed by the housing 27 bolted to the body of the valve casing there being a partition 28 between the inlet chamber 14 and the pressure chamber. This partition however has an equalizing opening 29 for purposes which will be described. The valve stem 25 is provided with a thrust collar 30 engaged by the spring 31 seated upon the partition 28. The spring biases the valve member to feed port closing position as shown in Fig. 2. In this position the circulation in the pump is through the by-pass.

The valve member 24 is moved from feed port closing position to circulating closing position by the pressure actuated bellows 32 arranged in the pressure chamber. The bellows is provided with a mounting plate 321 which is clamped between the housing 27 and the casing body 8. The free end of the bellows is connected through the plate 33 to the valve stem. The stem is provided with a guide portion 34 at its outer end and with a spiderlike guide 35 at its inner end reciprocating in the port member 20.

The pressure chamber is connected to the feed conduit on the discharge side of the pump by the pipe or conduit 36 which has a solenoid actuated control valve shown conventionally at 37 and operatively connected to the thermostat, the connection being indicated at 38. This valve is closed or seated when the temperature of the heated space is above a predetermined degree or point. When the temperature falls below that degree the valve 37 is opened allowing the circulating medium to flow through the pipe or conduit 36.

Inasmuch as there is a differential between the inlet side of the pump and the discharge side of the pump the bellows is actuated to open the feed port. The heating medium is then circulated through the boiler and the heat exchange unit or radiator until the heated space temperature again reaches the predetermined degree and the valve 37 is closed. The opening 29 to the interior of the bellows and the restricted opening 39 in the wall of the bellows permits the pressure to equalize within and without the bellows. When this occurs the spring 31 and such resiliency as the bellows may have results in the closing of the feed port and opening of the by-pass port so that the heating medium is again circulated through the by-pass until the temperature requirement results in repeating the operation described.

Satisfactory temperature control may be had by the use of a conventional type of thermostat. The thermostat embodying the features of the Dehn & Armstrong patent #2,418,762, issued April 8, 1947 may be used. The contact in the Dehn and Armstrong is made interruptedly so that hot water will be passed from the heating unit only a portional time each minute. The purpose is to secure a greater degree of accuracy in control as is pointed out in the said Dehn and Armstrong patent. The valve 37 could be manually manipulated through some control device such as a switch or mechanical means, if desired but the thermostatic control means is a highly desirable one.

As stated, I have illustrated various parts of my invention largely in a diagrammatic and conventional form but it will be understood that my invention is capable of embodiment in various standard or conventional heating systems. It is believed that with the disclosure made those skilled in the art will be able to embody or adapt my invention as may be desired.

Having thus described my invention, what I claim as new and desire to secure by Letters Patent is:

1. The combination in a heating system including a boiler, a heat exchange unit, feed and return conduits connecting said boiler and heat exchange unit and a circulating pump disposed in the feed conduit, of a thermostat in the heated space, a circulation control valve disposed in the feed conduit between the boiler and pump and comprising a casing provided with a feed port connected to the feed conduit in advance of the pump and a by-pass port connected to the return conduit, the inlet of the pump opening to said casing between said ports, said ports being in aligned spaced relation, said valve casing having a pressure chamber therein, a valve member reciprocatingly supported between said ports to alternately coact therewith, said valve having a stem projecting into said pressure chamber, a spring acting to bias said valve member to feed port closing position, a bellows disposed within said pressure chamber and connected at its free end to said stem, the interior of the bellows having an opening to said casing in advance of the feed port, a pressure conduit connected to the discharge of the pump and to said pressure chamber, said bellows having a restricted pressure equalizing opening to said pressure chamber, and a normally seated solenoid controlled valve for said pressure conduit operatively connected to said thermostat.

2. The combination in a heating system including a boiler, a heat exchange unit, feed and return conduits connecting said boiler and heat exchange unit and a circulating pump disposed in the feed conduit, of a thermostat in the heated space, a circulation control valve disposed in the feed conduit between the boiler and pump and comprising a casing provided with a feed port connected to the feed conduit in advance of the pump and a by-pass port connected to the return conduit, the inlet of the pump opening to said casing between said ports, said ports being in aligned spaced relation, said valve casing having a pressure chamber therein, a valve member reciprocatingly supported between said ports to coact therewith, said valve having a stem projecting into said pressure chamber, means acting to bias said valve member to feed port closing position, a pressure actuated element within said chamber operatively connected to said stem, a pressure conduit connected to the discharge of the pump and to said pressure chamber, and control valve for said pressure conduit operatively associated with said thermostat.

3. The combination in a heating system including heating medium source, a heat exchange unit, feed and return conduits connecting said heating medium source and heat exchange unit and a circulating pump disposed in the feed conduit, of a thermostat in the heated space, a circulation control valve disposed in the feed conduit between the said source and pump and comprising a casing provided with a feed port connected to the feed conduit in advance of the pump and a by-pass port connected to the return conduit, the inlet of the pump opening to said casing between said ports, said valve casing having a pressure chamber therein, valves for said ports connected to alternately open and close the ports and having a stem projecting into said pressure chamber, a spring acting to bias the feed port valve to closed position, a bellows disposed within said pressure chamber and connected at its free end to said stem, the interior of the bellows being open to the controlled medium in advance of the feed port, a conduit connected to the discharge of the pump and to said pressure chamber, said bellows having a pressure equalizing opening to said pressure chamber, and a normally seated control valve for said pressure conduit operatively associated with said thermostat.

4. The combination in a heating system including heating medium source, a heat exchange unit, feed and return conduits connecting said heating medium source and heat exchange unit and a circulating pump disposed in the feed conduit, of a thermostat in the heated space, a circulation control valve disposed in the feed conduit between the said source and pump and comprising a casing provided with a feed port connected to the feed conduit in advance of the pump and a by-pass port connected to the return conduit, the inlet of the pump opening to said casing between said ports, said valve casing having a pressure chamber therein, valves for said ports connected to alternately open and close the ports and having a stem projecting into said pressure chamber, a bellows disposed within said pressure chamber and connected at its free end to said stem, a conduit connected to the discharge of the pump and to said pressure chamber exteriorly of said bellows, and a control valve for said pressure conduit operatively associated with said thermostat.

5. In a heating system comprising feed and return conduits and a pump disposed in the feed conduit, valve means in the feed conduit in advance of the pump comprising a casing provided with a feed port connected to the feed conduit and a by-pass port connected to the return conduit, the inlet of the pump opening to both ports, said valve casing having a pressure chamber therein, valves for said ports connected to alternately open and close the ports and having a stem projecting into said pressure chamber, a yielding means acting to close the feed port valve, a chambered pressure actuated element disposed within said pressure chamber and operatively connected to said stem, the interior of said element being open to the pressure in the feed conduit in advance of the feed port, a conduit connected to the discharge of the pump and to said pressure chamber exteriorly of said element, said element having a pressure equalizing opening to said pressure chamber and a control valve for said pressure conduit.

6. The combination with the feed and return conduits of a heating system of a circulating pump, a three-way circulation control valve comprising, a casing provided with a feed port connected to the feed conduit and a by-pass port connected to a return conduit, the inlet of the pump being open to both of said ports, a valve means common to both of said ports and normally closing the feed port, and a pressure actuated means for said valve for opening said feed port, said pressure actuated means having a valved connection to the discharge of the pump and being subject to the pressure in the feed conduit in advance of said circulation control valve whereby the valve is actuated by differential in pressure between the intake and the discharge of the pump when the valve in said pressure connection is open.

7. In a heating system comprising feed and return conduits, a circulating pump having its inlet connected to said feed conduit, a valve in the feed conduit in advance of the pump comprising a casing provided with a feed port connected to the feed conduit and a by-pass port connected to the return conduit, the inlet of the pump opening to both said ports, said valve casing having a pressure chamber therein, valve means for alternately opening and closing the ports and including a stem projecting into said pressure chamber, a yielding means acting to urge the valve means to close the feed port, a chambered pressure actuated element disposed within said pressure chamber and operatively connected to said stem, the interior of said element being open to the pressure in the feed conduit in advance of the feed port, a conduit connected to the discharge of the pump and to said pressure chamber exteriorly of said element, said element having a pressure equalizing opening to said pressure chamber, and a control for said pressure conduit.

8. In a heating system comprising feed and return conduits, a circulating pump, a valve in advance of the pump comprising a casing provided with a feed port connected to the feed conduit and a by-pass port connected to the return conduit, the inlet of the pump opening to both said ports, said valve casing having a pressure chamber therein, valve means for alternately opening and closing the ports and including a stem projecting into said pressure chamber, a chambered pressure actuated element disposed within said pressure chamber and operatively connected to said stem, the interior of said element being open to the pressure in the feed conduit in advance of the feed port, a conduit connected to the discharge of the pump and to said pressure chamber exteriorly of said element, said element having a pressure equalizing opening to said pressure chamber, and a control for said pressure conduit.

9. A heating system comprising feed and return conduits, a circulating pump, a valve in advance of the pump comprising a casing provided with a feed port connected to the feed conduit and a by-pass port connected to the return conduit, the inlet of the pump opening to said casing between said ports, a valve member coacting with said ports and positioned to alternately open and close them, and a pressure actuated means for actuating said valve member to feed port opening and by-pass closing position, said pressure actuated means having a valved connection to the discharge of the pump and being subject to the pressure in the feed conduit in advance of said valve whereby the valve is actuated by differential in pressure between the discharge of the pump and feed conduit ahead of said valve when the valve in said pressure connection is open.

10. A heating system comprising feed and return conduits, a circulating pump, a valve in advance of the pump having a feed port connected to the feed conduit and a by-pass port connected to the return conduit, the inlet of the pump opening to both said ports, a valve member coacting with both said ports, a pressure actuated means for actuating said valve member, said pressure actuated means having a connection to the discharge of the pump and being subject to the pressure in the feed conduit in advance of said circulation control valve whereby the valve is actuated by differential in pressure between the discharge of the pump and feed conduit ahead of said valve when said pressure connection is open, an electrically controlled valve in said connection to said pressure actuated means, and a thermostat having an interruptedly operated demand circuit connected to operate said electrically controlled valve.

ADAM E. ARMSTRONG.

References Cited in the file of this patent

UNITED STATES PATENTS

| Number | Name | Date |
| --- | --- | --- |
| 2,065,481 | Thulman | Dec. 22, 1936 |
| 2,262,194 | Newton | Nov. 11, 1941 |
| 2,490,932 | Thuney | Dec. 13, 1949 |

FOREIGN PATENTS

| Number | Country | Date |
| --- | --- | --- |
| 253,317 | Great Britain | June 17, 1926 |